United States Patent Office 2,939,863
Patented June 7, 1960

2,939,863

NOVEL ESTERS, ACIDS, AND LINEAR POLYMERS FROM BIS-HALOMETHYLATED AROMATICS AND ALKALI METAL ALKYL ESTERS

Louis A. Mikeska, Westfield, and Donald F. Koenecke, Elizabeth, N.J., assignors to Esso Research and Engineering Company, a corporation of Delaware No Drawing. Filed Dec. 30, 1953, Ser. No. 401,436

3 Claims. (Cl. 260—75)

This invention relates to polybasic aromatic acids and esters, and to methods of synthesizing them. More particularly it relates to reactions wherein bis-halomethylated aromatic hydrocarbons are condensed with esters of either malonic or acetoacetic acid. In its most specific aspect the invention relates to dibasic and tetrabasic acids and esters derived from bis-chloromethyl aromatics such as durene. In its preferred embodiment the invention relates specifically to the condensation of bis-chloromethyl durene and esters of malonic acid, whereby 2,3,5,6-tetramethylphenylene-di-propionic acid and esters thereof can be produced.

The dibasic acids and esters produced in accordance with this invention can be used in the production of linear polymeric resinous polyesters suitable for the preparation of synthetic fibers. The dibasic as well as the tetrabasic acids can also be used as intermediates in the preparation of esters or polyesters useful as plasticizers, lube oil addition agents, or synthetic lubricants. Furthermore, in accordance with the present invention direct preparation of tetrabasic esters is possible. Such tetrabasic esters may then be used in synthesizing thermosetting resins suitable for molding and the like.

The principal reagents used are bis-halomethylated aromatics and alkali metal alkyl esters of malonic, alkyl malonic or acetoacetic acid.

The bis-halomethylated aromatics can be represented by the symbolic formula $Z.CH_2.X.CH_2.Z$ wherein Z is selected from the group consisting of chlorine, bromine and iodine and X is selected from the group consisting of 2,3,5,6-tetramethylphenylene, 2,5-dimethylphenylene, and difunctional symmetrically methylated naphthalene and anthracene radicals.

The metal alkyl esters can be represented by the symbolic formula $MCR'Y(COOR'')$ wherein M is a metal selected from the group consisting of sodium and potassium, R' is selected from the group consisting of hydrogen and $C_1$ to $C_4$ alkyl radicals, Y is selected from the group consisting of acetyl and COOR'' radicals, and R'' is selected from the group consisting of $C_1$ to $C_4$ alkyl radicals.

The preferred bis-halomethylated aromatic is bis-chloromethyl durene, though bis-bromomethyl durene and bis-iodomethyl durene can be used similarly. Furthermore it is also possible to use other symmetrically alkyl substituted bis-halomethyl aromatics, notably bis-chloromethyl-para-xylene or the analogous bromine or iodine derivatives. The homologues of naphthalene and anthracene, e.g. symmetrical bis-chloromethyl hexamethyl naphthalene, may also be used. On the other hand, bis-chloromethyl benzene itself and bis-chloromethyl derivatives of ortho or meta xylene appear to be of little value, particularly if linear polymers are the desired end product.

The preferred metal alkyl ester is sodium ethyl malonate, $NaCH(COOR)_2$, though other $C_1$ to $C_4$ malonates, e.g. potassium methyl malonate, potassium isopropyl malonate, sodium n-butyl malonate and sodium isobutyl malonate are similarly effective. Furthermore, instead of malonates, it is possible to use the analogous metal alkyl esters of alkylmalonic acid, e.g. potassium ethyl methylmalonate, $KC.CH_3(COOC_2H_5)_2$, or sodium methyl butylmalonate, $NaC.C_4H_7(COOCH_3)_2$, or the esters of acetoacetic acid such as sodium ethyl acetoacetate, $NaCH(CH_3CO)(COOC_2H_5)$, or potassium propyl ethylacetoacetate, $KC.C_2H_5(CH_3CO)(COOC_3H_7)$.

Using the symbolic formulas defined above, the basic reaction on which the invention is based can be represented as follows:

(1)

$Z.CH_2.X.CH_2.Z + 2MCR'Y(COOR'') \longrightarrow$
Bis-halo-methyl aromatic    Metal alkyl ester

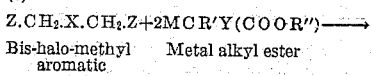 $+ 2MZ$
Condensed ester    Metal halide

This reaction is carried out at temperatures in the range of 25–85° C. The condensed polybasic ester can then be used as such as a plasticizer or the like, or it can be hydrolyzed in an otherwise conventional manner and the resulting acid can be condensed with suitable polybasic reagents such as glycols, diamines, dimercaptans, etc.

When bis-chloromethyl durene and a malonic acid ester are reacted in accordance with the preferred embodiment of the invention, Equation 1 may be rewritten as follows:

(2)

$ClCH_2.X.CH_2Cl + 2MCH(COOR'')_2 \longrightarrow$
Bis-chloromethyl durene    Metal alkyl malonate

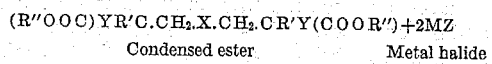
Tetrabasic ester    Metal chloride

The tetrabasic ester from Reaction 2 can be hydrolyzed to yield the corresponding tetrabasic acid and alcohol:

(3)

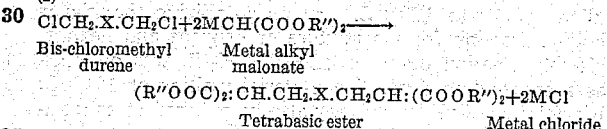
Tetrabasic acid    Alcohol

The tetrabasic esters of the corresponding acids can be condensed with other polyfunctional compounds such as dihydric alcohols, e.g. ethylene glycol, to form thermosetting resins useful as molding compounds or the like.

Alternatively, it is preferred to decompose the tetrabasic acid from Reaction 3 into the corresponding dibasic acid which can be used for making linear, thermoplastic polymers. The decomposition can be achieved simply by heating the tetrabasic acid in an inert atmosphere at temperatures between about 180° and 350° C.:

(4)

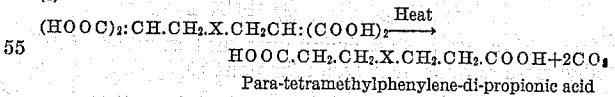
Para-tetramethylphenylene-di-propionic acid

The dibasic acid itself then may be condensed with bifunctional reagents such as dihydric alcohols to yield high molecular weight liquids or resinous solids, or it may first be converted into the corresponding $C_1$ to $C_3$ alkyl esters which in turn may be condensed with the other bifunctional compounds such as glycols, diamines, dimercaptans and the like. Particularly good fiber-forming polymers of high softening point can be obtained by condensing the aforesaid alkyl esters with ethylene glycol, trimethylene glycol, tetramethylene glycol or hexamethylene glycol. Interesting resins can also be prepared from other glycols such as pentamethylene glycol or other higher glycols having, for instance, 8 or 10 methylene groups such as decamethylene glycol, though these resins generally tend to be too low melting to be useful for fiber manufacture. In these condensation with glycol reactions it is preferred to use an excess of the glycol.

For a better understanding of the invention specific working examples will now be given. To simplify writing the various structural formulas and to avoid unnecessary repetition, it will be understood that the symbol X is used in the examples to indicate the tetramethylphenylene radical

*Example 1*

(A) PREPARATION OF BIS-CHLOROMETHYL DURENE 268 gms. (2 moles) of pure durene and 567 gms. (6 moles) of chloromethyl ethyl ether were charged to a flask equipped with a return condenser. Thereafter 30 gms. of stannic chloride dissolved in 100 ml. chloroform was added, resulting in a slight rise in temperature. The reaction mixture was gently heated on a steam bath for five hours, by which time the mixture separated into two layers. The lower layer which weighed 90 gms. was separated from the upper layer and was discarded.

The upper layer was washed first with dilute hydrochloric acid and then with water. Diethyl ether was used as diluent for the upper layer. The ether extract was then dried over sodium sulfate. On removal of the diluent the residue was distilled under 2 mm. Hg pressure. The first fraction distilled at 109 to 110° C. and consisted essentially of monochloromethyl durene. The second distilled at 110 to 130° C. By recrystallizing the higher boiling fraction from a mixture of benzene and hexane, bis-chloromethyl durene, $ClCH_2.X.CH_2Cl$, was obtained as a snow-white crystalline material melting at 194° C. Bis-chloromethyl durene may also be referred to as para-tetramethylxylylene chloride.

Further quantities of bis-chloromethyl durene were also obtained by reacting the aforesaid monochloromethyl durene fraction with additional amounts of chloromethyl ethyl ether in the presence of a solution of stannic chloride in chloroform. Instead of stannic chloride, it is possible also to use zinc chloride and similar condensation catalysts. Likewise, instead of the alkyl chloromethyl ether it is possible to use hydrogen chloride and formaldehyde as the chloromethylation agent. An improved method for synthesizing bis-halomethyl aromatics is also described and claimed in copending application Serial No. 280,366, filed April 3, 1952, by Mikeska and Thompson. Still other specific methods of preparing bis-chloromethyl durene and its analogues and homologues are known in the art and no claim of novelty is made here for any of these bis-halomethyl aromatic compounds nor for their methods of preparation.

(B) PREPARATION OF ETHYL PARA-TETRAMETHYL-XYLYLENEDIMALONATE, $C_{26}H_{38}O_8$

The bis-chloromethyl durene was next converted into ethyl para-tetramethylxylylenedimalonate, $(C_2H_5OOC)_2.CH.CH_2.X.CH_2.CH.(COOC_2H_5)_2$ which may also be referred to as ethyl 2,3,5,6-tetramethylphenylene-bis-methylenemalonate.

For this purpose 780 ml. of freshly dried absolute ethyl alcohol was charged into a three-way flask equipped with a stirrer, a return condenser and a thermometer. 25.3 gms. (1.1 moles) of metallic sodium was slowly added to the alcohol with rapid stirring and sufficient cooling to hold the reaction under control.

When all the sodium had dissolved, 192 gms. (1.2 moles) of freshly distilled ethyl malonate was added in a single portion to form sodium ethyl malonate, $NaCH(COOC_2H_5)_2$ No rise in temperature was observed. After the reactor contents had been thoroughly mixed, 115.5 gms. (0.5 mole) of bis-chloromethyl durene was gradually added in about 10 gm. portions. The temperature rose spontaneously from 25 to 50° C. and the mixture was then refluxed with stirring for 4.5 hours. Qualitative tests showed at this point that the reaction product was free of organic chlorine. It was, therefore, cooled, poured into water, and acidified with hydrochloric acid using Congo red as an indicator. The tetrabasic ester precipitated as a snow-white crystalline material which was readily isolated by filtration. It was purified by slurrying several times with water to remove the inorganic salts present.

On drying, the ester weighed 238 gms. (calc.=239 gms.) and melted at 98° C. Repeated recrystallization from absolute alcohol failed to affect the melting point of the product, indicating its high degree of purity. The purity was further confirmed by analysis.

(C) PREPARATION OF PARA-TETRAMETHYLXYLYL-ENEDIMALONIC ACID, $C_{18}H_{22}O_8$

The tetrabasic ethyl dimalonate ester just described was converted into the corresponding tetracarboxylic acid by hydrolysis. For this purpose 239 gms. (0.5 mole) of the ester and 900 cc. of 95% ethyl alcohol was charged to a glass reactor fitted with a stirrer, a reflux condenser, a thermometer, and a dropping funnel. The dropping funnel was charged with a solution containing 168 gms. (3 moles) of potassium hydroxide dissolved in 300 cc. water. The reactor charge was then heated to refluxing temperature, whereupon the alkali was added from the dropping funnel at a rate just sufficient to keep the reactor contents boiling gently without application of external heat. The reaction was completed by refluxing the mixture for three hours.

To isolate the reaction product, water was added and the solution was acidified with hydrochloric acid. The product acid, which precipitated as a snow white crystalline material, was slurried several times with water to wash out inorganic salts. Thus purified and dried at 120° C. for 8 hours, the product weighed 183 gms. Titration with sodium hydroxide showed that the product had a combining weight of 90.81, compared with a theoretical combining weight of 91 for para-tetramethylxylylenedimalonic acid.

(D) PREPARATION OF PARA-TETRAMETHYLPHENYL-ENEDIPROPIONIC ACID, $C_{16}H_{22}O_4$

The tetracarboxylic acid described above was next converted into 2,3,5,6-tetramethylphenylenedipropionic acid,

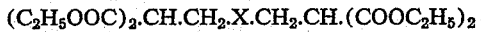

Accordingly, the tetracarboxylic acid was transferred into a resin flask which was set up in such a way as to make it possible to heat it by means of a metal bath. While stirring, the temperature of the metal bath was gradually raised to a final temperature of 330° C. The mixture was protected against oxidation by passing nitrogen through the molten material during the course of the heating. As the reaction proceeded, the material in the reaction flask gradually melted. When the reaction mixture became homogeneous, and the evolution of carbon dioxide ceased, the reaction was considered completed.

On cooling, the product consisted of 139 gms. of light colored crystalline material, having a combining weight of 147.6. Theoretical yield equals 139 gms. and calculated combining weight equals 139.

(E) PREPARATION OF METHYL TETRAMETHYL-PHENYLENE DIPROPIONATE, $C_{18}H_{26}O_4$

The dibasic acid described above was converted into the corresponding methyl ester as follows:

A round bottom flask equipped with a stirrer, a return condenser, and a stoppered inlet for the addition of phosphorus pentachloride, was charged with 139 gms. of the dibasic acid, 325 ml. of chloroform, and 325 ml. of toluene. Then while stirring, 228 gms. of phosphorus pentachloride was added in small portions. The mixture was finally refluxed at 65° C. for three hours.

While still hot, the reaction mixture was decanted from a small amount of undissolved material into a Claisen flask. The solvents and the phosphorus oxychloride formed, were removed at 100° C. under 1 mm. Hg pressure. The crystalline residue was then refluxed for 3 hours with a mixture of 250 ml. methanol and 250 ml. toluene.

On completion of the reaction, the mixture was cooled, diluted with water, extracted with ether, washed with water and was finally dried over sodium sulfate. The solvents were then removed and the residue was distilled under 1 mm. Hg pressure. The fraction boiling at 164–165° C. weighed 141 gms., and had a melting point of 110° C. This was the methyl ester of 2,3,5,6-tetramethylphenylenedipropionic acid, which may also be referred to as methyl para-tetramethylxylylene diacetate.

On condensation of the above-described ester with glycols, diamines, dimercaptans, etc., high molecular weight polymers, useful as resins and as fiber forming materials, can be obtained as mentioned earlier herein.

*Example 2*

The condensation of the durene dipropionate ester with a glycol is illustrated by the following:

A Claisen flask fitted with a capillary tube, a thermometer and a side arm receiver was charged with 30 g. (0.1 mole) of dimethyl 2,3,5,6-tetramethylphenylene dipropionate, melting point 110° C., acid value 0, 63 g. (0.7 mole) of tetramethylene glycol, $HO(CH_2)_4OH$ and 0.2 g. of sodium methylate catalyst, $NaOCH_3$. The reaction mixture was heated at atmospheric pressure by means of a metal bath while nitrogen gas was bubbled through the capillary tube. At a bath temperature of about 120° C. vapors were distilled over at a vapor temperature of 60–65° C., indicating that methanol had been liberated and ester interchange had begun. Whenever the vapor temperature started to drop the bath temperature was slowly raised until reaching 250–260° C. At this level the vapor temperature rose to about 190° C. as the excess glycol began to distill over.

When the ester interchange was complete, the remaining product appeared to consist primarily of di-4-hydroxybutyl tetramethylphenylene dipropionate, $HO(CH_2)_4OOCCH_2CH_2.X.CH_2CH_2COO(CH_2)_4OH$ wherein X represents the tetramethylphenylene radical. This product was polymerized under reduced pressure (2–6 mm. Hg) and at metal bath temperatures up to 310° C. The major amount of polymerization occurred at 280–290° C. At this temperature and pressure all the excess glycol was distilled out of the reaction mixture.

After only 2 hours at 280° C. and under 2–6 mm. Hg pressure, the viscosity of the product was increasing visibly. A sample of the resulting resin was found to be readily ductile, forming fibers or filaments. Though somewhat fragile, these filaments could be cold drawn with proper care. After 4 hours the resinous polymer was very readily drawn into filaments. These filaments were stronger, clear and light in color and much more easily cold drawn than the filaments from the less completely polymerized resin. The resulting cold drawn fibers were much stronger, more flexible and somewhat opaque.

Additional heating caused the viscosity of the resin to become very high even at 280–290° C. When the bath temperature reached 310° C. some decomposition occurred. The optimum polymerization temperature accordingly appears to be nearer 280–290° C. and the polymerization time a little over 4 hours. The fiber properties were less desirable if the polymerization were carried too far or if the temperature were forced to 310° C. causing discoloration.

*Example 3*

The durene dipropionate ester was also condensed with hexamethylene glycol. In this example 31 g. (0.1 mole) of dimethyl 2,3,5,6-tetramethylphenylene dipropionate was mixed with 24 g. (0.2 mole) of hexamethylene glycol and 0.2 g. of sodium methylate catalyst and heated substantially as described in Example 2. Methanol vapors started distilling over when the metal bath temperature approached 170° C. Upon further heating some of the excess glycol started distilling over as the bath temperature reached 220° C. At this point the product consisted of the diglycol ester.

Since at these conditions condensation was too slow for practical use, the pressure was reduced to 2–4 mm. Hg and the temperature raised to 260° C. After 4.5 hours at the last named conditions the reaction mass became more viscous and had a softening point of 145° C. The molten polymer was readily drawn into long filaments which were slightly tacky but could be cold drawn. The polymerization was continued for another 2.75 hours between 280° C. and 290° C. under 2–3 mm. Hg pressure. During this time the softening point rose to 160–165° C. after which the reaction was discontinued.

The final polyester was very easily extruded or drawn into light colored filaments or fibers. The filaments were easily cold drawn to threads without tack and with excellent strength and flexibility. The oriented cold drawn fibers were opaque and white. They had a slippery smooth feel. Threads were readily tied into tight knots without breaking. Samples were found to be just as flexible and strong after 4 months' aging, without any evidence of embrittlement.

The polymer was soluble in hot dimethyl formamide, but insoluble in other solvents such as ether, methyl ethyl ketone, hydrocarbons or ethyl acetate.

Similar fiber-forming resins were also prepared by reacting the dimethyl tetramethylphenylene dipropionate with an excess of decamethylene glycol and with trimethylene glycol, respectively. The resinous polydecamethylene ester readily gave fibers characterized by a particularly high degree of elasticity.

Having described the general nature and specific examples of the invention, it will be understood that this has been done principally for the purpose of illustration and that the ultimate scope and spirit of the invention is more particularly pointed out and claimed below.

The claims:

1. A process for preparing a fiber-forming linear polymer which comprises (1) reacting at 25–85° C. one mole of a bis-halomethyl aromatic hydrocarbon having the formula $Z.CH_2.X.CH_2.Z$, with about 2 to 2.5 moles of an alkali metal alkyl diester having the formula $MCR'(COOR'')_2$ (2) hydrolyzing the resulting condensed tetrabasic ester having the formula $(R''OOC)_2R'C.CH_2.X.CH_2.CR'(COOR'')_2$ to the corresponding tetrabasic acid, having the formula $(HOOC)_2R'C.CH_2.X.CH_2.CR'(COOH)_2$, (3) decomposing said tetrabasic acid by heating at temperatures of 180–350° C., into the corresponding dibasic acid, having the formula $(HOOC)R'CH.CH_2.X.CH_2.CHR'(COOH)$, (4) heating to 170–220° C. said dibasic acid with a molecular excess of a glycol having the formula $HO.(CH_2)_n.OH$ to yield the condensation product having the formula $HO.(CH_2)_nOOC.R'CH.CH_2.X.$
$CH_2CHR'.COO(CH_2)_n.OH$ and (5) continuing said heating at reduced pressures of about 2–6 mm. Hg pressure and temperatures of up to about 310° C. to produce said fiber-forming linear polymer, in the above formulae Z being a halogen atom, X being a radical selected from the group consisting of 2,3,5,6-tetramethylphenylene and 2,5-dimethylphenylene, M being an alkali metal, R' being a substituent selected from the group consisting of hydrogen and $C_1$ to $C_4$ alkyl radicals, R'' being a $C_1$ to $C_4$ alkyl radical and n being an integer selected from the group consisting of 1 to 4, 6, 8 and 10.

2. A process for preparing a fiber-forming linear polymer which comprises (1) dissolving about 1 to 1.5 moles of metallic sodium in about 10 to 20 moles of anhydrous ethyl alcohol to form a sodium ethoxide solution while maintaining the temperature below about 70° C., (2) mixing with said solution about 0.8 to 2 moles of ethyl malonate per mole of said dissolved sodium ethoxide to form sodium ethylmalonate, (3) gradually adding to the resulting solution about 0.3 to 0.5 mole of bischloromethyl durene per mole of sodium ethyl malonate and heating the resulting mixture at about 50 to 85° C. for about 2 to 10 hours, (4) precipitating the resulting ethyl 2,3,5,6-tetramethylxylylenedimalonate from the reaction mixture and hydrolyzing said dimalonate to convert it to 2,3,5,6-tetramethylxylylenedimalonic acid, (5) removing the acid from the hydrolyzed reaction mixture and heating the isolated acid in an inert atmosphere at a temperature of about 180° to 350° C. until about 2 moles of carbon dioxide are liberated per mole of said dimalonic acid, (6) converting the resulting 2,3,5,6-tetramethylphenylenedipropionic acid to methyl ester of 2,3,5,6-tetramethylphenylenedipropionic acid, (7) heating said dipropionate with a molecular excess of a glycol having the formula $HO.(CH_2)_n.OH$, wherein $n$ is an even number ranging from 2 to 10, at a temperature to effect an ester interchange and thereby to yield the condensation product, $$HO.(CH_2)_n.OOC.CH_2CH_2.X.CH_2CH_2.COO(CH_2)_n.OH$$

wherein X represents the 2,3,5,6-tetramethylphenylene radical and $n$ is an even integer ranging from 2 to 10, (8) continuing the heating at reduced pressures of about 2–6 mm. Hg pressure and temperatures of up to about 310° C. until said fiber-forming linear polymer is produced.

3. The resinous fiber-forming linear polymer product prepared in accordance with claim 2.

References Cited in the file of this patent

FOREIGN PATENTS 673,066    Great Britain _____ June 4, 1952

OTHER REFERENCES

Jour. Chem. Society (London), 53, 1888, pp. 2–47.
Rhoad et al.: J. Amer. Chem. Soc., 72, pages 2216–19, 1950.